United States Patent
Luo

(10) Patent No.: US 8,126,438 B2
(45) Date of Patent: Feb. 28, 2012

(54) METHOD AND SYSTEM FOR USING A MOBILE TERMINAL AS A LOCATION-BASED REMINDER

(75) Inventor: Hui Luo, Marlboro, NJ (US)

(73) Assignee: Broadcom Corporation, Irvine, CA (US)

(*) Notice: Subject to any disclaimer, the term of this patent is extended or adjusted under 35 U.S.C. 154(b) by 800 days.

(21) Appl. No.: 11/437,381

(22) Filed: May 19, 2006

(65) Prior Publication Data

US 2007/0270129 A1  Nov. 22, 2007

(51) Int. Cl.
*H04M 3/42* (2006.01)
*H04W 24/00* (2009.01)

(52) U.S. Cl. ............... 455/414.1; 455/456.1; 455/456.3

(58) Field of Classification Search ............... 455/414.1, 455/456.1, 456.3
See application file for complete search history.

(56) References Cited

U.S. PATENT DOCUMENTS

| | | | | | |
|---|---|---|---|---|---|
| 5,361,390 | A | * | 11/1994 | Heyen et al. | 718/102 |
| 5,774,650 | A | * | 6/1998 | Chapman et al. | 726/7 |
| 5,861,818 | A | * | 1/1999 | Ohtsuki | 340/7.52 |
| 6,078,820 | A | * | 6/2000 | Wells et al. | 455/466 |
| 6,177,905 | B1 | * | 1/2001 | Welch | 342/357.75 |
| 2001/0007441 | A1 | * | 7/2001 | Yamamoto | 340/994 |
| 2003/0051132 | A1 | * | 3/2003 | Kobayashi et al. | 713/153 |
| 2003/0143983 | A1 | * | 7/2003 | Crampton | 455/414 |
| 2004/0119600 | A1 | * | 6/2004 | Hampton | 340/691.1 |
| 2004/0203847 | A1 | * | 10/2004 | Knauerhase et al. | 455/456.1 |
| 2004/0266458 | A1 | | 12/2004 | Kataoka | |
| 2007/0037614 | A1 | * | 2/2007 | Rosenberg | 455/575.1 |
| 2007/0049323 | A1 | * | 3/2007 | Wang et al. | 455/525 |
| 2007/0089163 | A1 | * | 4/2007 | Denton | 726/2 |

FOREIGN PATENT DOCUMENTS

| | | |
|---|---|---|
| CN | 1578518 A | 2/2005 |
| GB | 2404115 A | 1/2005 |
| JP | 2002208890 | 7/2002 |
| WO | 9605678 A | 2/1996 |

* cited by examiner

*Primary Examiner* — Marisol Figueroa
(74) *Attorney, Agent, or Firm* — Sterne, Kessler, Goldstein & Fox PLLC

(57) ABSTRACT

Methods and systems for using a mobile terminal as a location-based reminder are disclosed. Aspects of one method may include a mobile terminal receiving a wireless signal comprising network identifying information, which may be, for example, a wireless network identifier string. The wireless network identifier string may be, for example, an extended service set IDs (ESSID) of WiFi access points in accordance with IEEE 802.1x. The received wireless network identifier may be authenticated, where the authentication may comprise using a SSL protocol or 802.1x/EAP-TTLS protocol. The mobile terminal may compare a keyword corresponding to a record stored within the mobile terminal with the wireless network identifier string. If the keyword is found in the wireless network identifier string, a notification may be generated to alert a user of the mobile terminal.

36 Claims, 8 Drawing Sheets

METHOD AND SYSTEM FOR USING A MOBILE TERMINAL AS A LOCATION-BASED REMINDER

CROSS-REFERENCE TO RELATED APPLICATIONS/INCORPORATION BY REFERENCE

[Not Applicable]

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to wireless communication. More specifically, certain embodiments of the invention relate to a method and system for using a mobile terminal as a location-based reminder.

BACKGROUND OF THE INVENTION

Mobile communication has changed the way people communicate and mobile phones have been transformed from a luxury item to an essential part of every day life. The use of mobile phones is today dictated by social situations, rather than hampered by location or technology. While voice connections fulfill the basic need to communicate, and mobile voice connections continue to filter even further into the fabric of every day life, the mobile Internet is the next step in the mobile communication revolution. The mobile Internet is poised to become a common source of everyday information, and easy, versatile mobile access to this data will be taken for granted. Third generation (3G) cellular networks have been specifically designed to fulfill these future demands of the mobile Internet. As these services grow in popularity and usage, factors such as cost efficient optimization of network capacity and quality of service (QoS) will become even more essential to cellular operators than it is today.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for using a mobile terminal as a location-based reminder, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for using a mobile terminal as a location-based reminder. Aspects of the method may comprise a mobile terminal receiving a wireless signal comprising network identifying information, which may be, for example, a wireless network identification string such as an extended service set IDs (ESSID) of WiFi access points in accordance with IEEE 802.1x. The received wireless network identifier may be authenticated if it comprises a uniform resource locator (URL). Authentication may comprise using a SSL connection to access the wireless network. Authentication may also comprise using an 802.1x/EAP-TTLS protocol if the wireless network identifier is an ESSID. An ESSID that fails authentication may be put in to an invalid list. The mobile terminal may compare a keyword corresponding to a record stored within the mobile terminal with the wireless network identifier string. If the keyword matches the wireless network identifier string, a notification may be generated and used to alert a user of the mobile terminal.

The user may have entered and stored the record into the mobile terminal, where the record may comprise a keyword field and a reminder field. The keyword field may contain at least one keyword. The user may generate the keyword in the keyword field and/or a memo in the reminder field. The keyword and/or the memo may also be generated from an incoming message to the mobile terminal. The memo may comprise an audio message, a video message, and/or a text message. After being notified, the user may choose to see and/or hear the memo in the reminder field, or the user may defer until a later time. If deferred, the mobile terminal may notify the user after a period of time.

Figure 1:
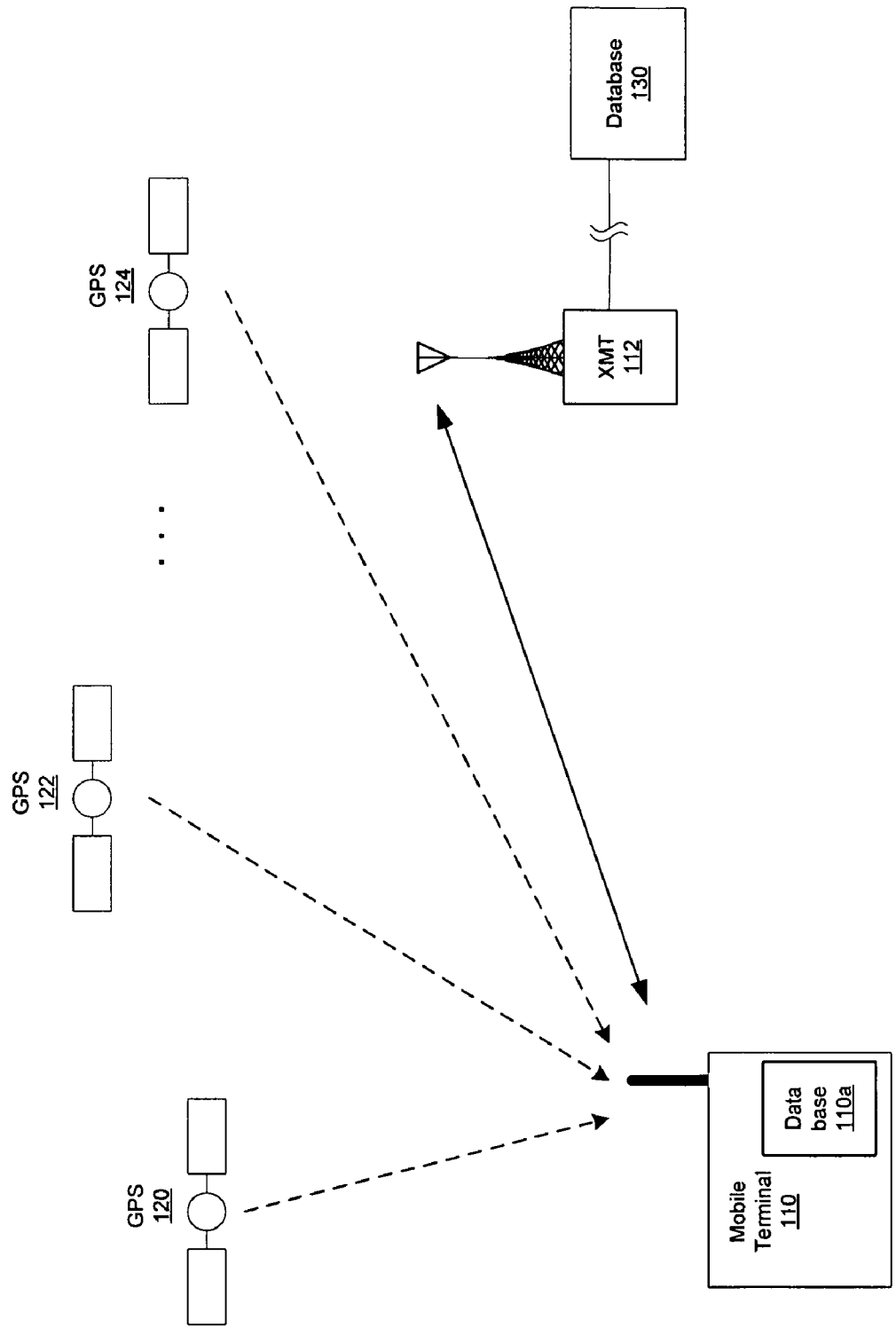
FIG. 1 is a block diagram of an exemplary cellular system using GPS for position locating, which may be utilized in connection with an embodiment of the invention.

FIG. 1 is a block diagram of an exemplary cellular system using GPS for position locating, which may be utilized in connection with an embodiment of the invention. Referring to FIG. 1, there is shown a mobile terminal 110, a transmitter 112, a plurality of global positioning system (GPS) satellites 120, 122, . . . , 124, and a database center 130. The mobile terminal 110 may comprise a database 110a with information that may be used to convert GPS information to, for example, addresses and/or store names. The transmitter 112 may be, for example, a base station. A modern cellular phone may comply with the E911 standard mandated by the Federal Communication Commission (FCC). Accordingly, if the E911 feature is enabled, when a 911 call is made via the base station 112, the mobile terminal 110 may transmit its location information to the E911 center. The location information may comprise longitude and latitude, and possibly altitude. Accordingly, the location information may be mapped to provide an address to an emergency response team. The emergency response team may then go to the location where the E911 call originated to provide aid.

The GPS system consists of a plurality of satellites, for example, the GPS satellites 120, 122, . . . , 124, that orbit the earth at an altitude of about 10,900 miles and at an inclination of 55 degrees. This orbit translates to an orbital period of 12 hours. The orbits are distributed around the earth in such a way that at least 4 satellites are always visible from virtually any point on the surface of the earth. Accordingly, this provides a means of determining the position of the user in longitude, latitude, and altitude.

Utilizing the GPS satellites 120, 122, . . . , 124 to determine a location in latitude and longitude may also be useful to the user of the mobile terminal 110. For example, the location may be used for navigation and/or notifying the user when the user is near a certain address. However, generally, data from a database may be needed to be able to map the latitude and longitude to a more user-friendly form, such as, for example, an address or position on a map. The mobile terminal 110 may have this data in the database 110a, for example. Data for the database 110a may be downloaded, for example, from an Internet service provider, or from a third-party Internet site that may provide the data. Alternatively, a database external to the mobile terminal 110 may be accessed. The database may be, for example, provided by the database center 130, where the database center 130 may be affiliated with a company providing the cellular phone service, or with a third party.

Although the mobile terminal 110 in FIG. 1 may have been described with respect to a cellular system, the mobile terminal 110 may also be used for other wireless systems. For example, the mobile terminal 110 may also be WiFi enabled and/or DVB-H enabled.

Figure 2:
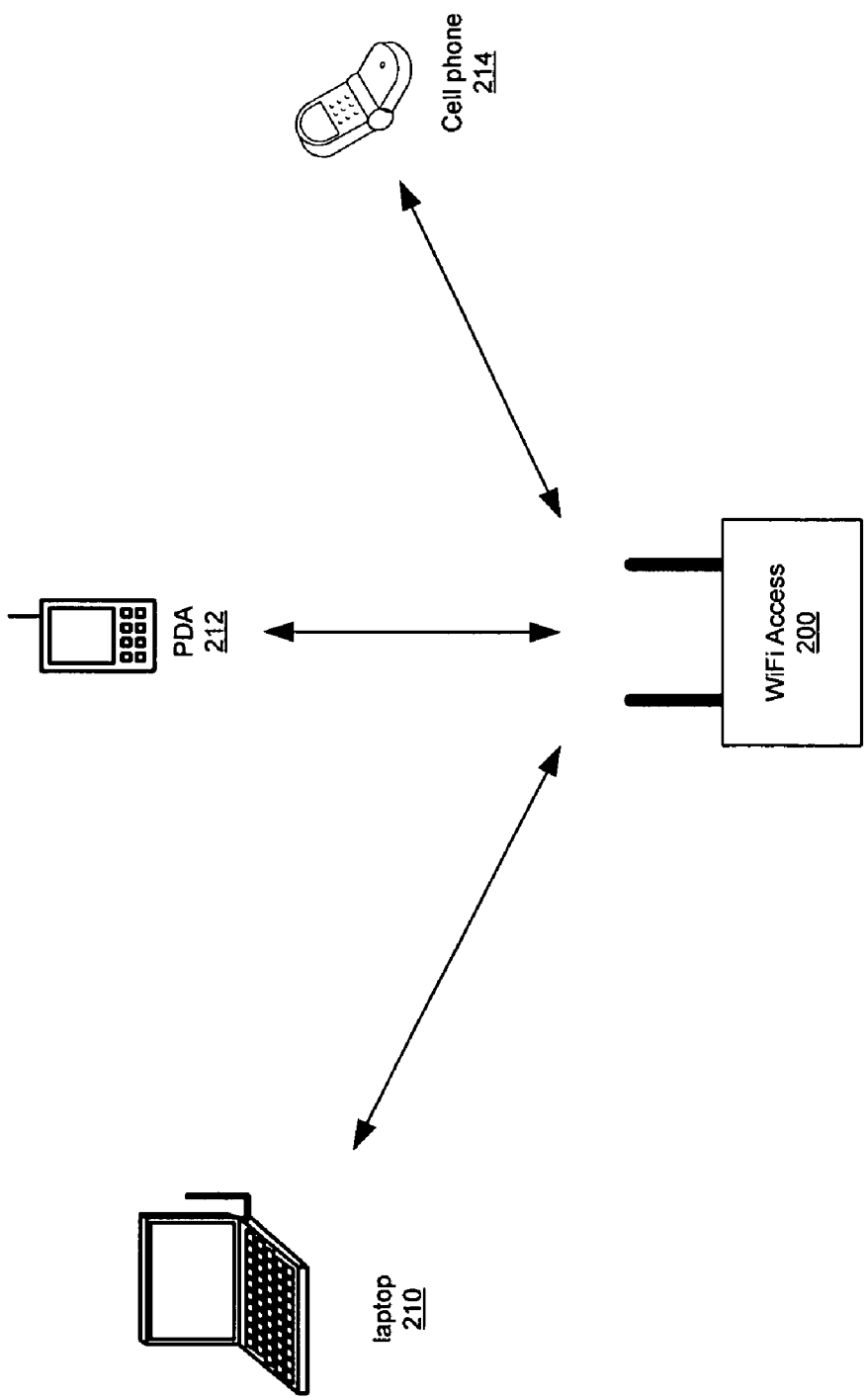
FIG. 2 is a block diagram illustrating an exemplary WiFi system, which may be utilized in connection with an embodiment of the invention.

FIG. 2 is a block diagram illustrating an exemplary WiFi system, which may be utilized in connection with an embodiment of the invention. Referring to FIG. 2, there is shown an 802.11 network local area network (WiFi LAN) access point 200, a laptop 210, a PDA 212, and a cellular phone 214. The WiFi LAN access point 200 may enable wireless access to a WiFi network by a variety of terminals that may be configured for WiFi access. For example, the mobile terminal 110, which may be the laptop 210, the PDA 212, or the cellular phone 214, may comprise a WiFi interface that may enable communication to a LAN via the WiFi LAN access point 200.

In order to access a WiFi network, a terminal, such as for example, the cellular phone 214, may scan for the extended service set IDs (ESSID) of WiFi LANs that may be within range. A WiFi LAN access point, for example, the WiFi LAN access point 200, may broadcast its ESSID as an identifying name of an 802.11 network. A ESSID may be a string of characters that may be descriptive of the location. For example, a business that offers LAN access may include its business name in the ESSID in order for its customers to be able to identify its LAN. A customer may then select the ESSID of interest in order to allow the mobile terminal, for example, the cellular phone 214, to access the LAN associated with the selected ESSID. Accordingly, a mobile terminal, for example, the mobile terminal 110, may be WiFi enabled and may be able to detect and/or access a WiFi network. The mobile terminal 110 may then be able to perform a location based reminder. Location based reminder may be described in more detail with respect to FIGS. 3-8.

Figure 3:
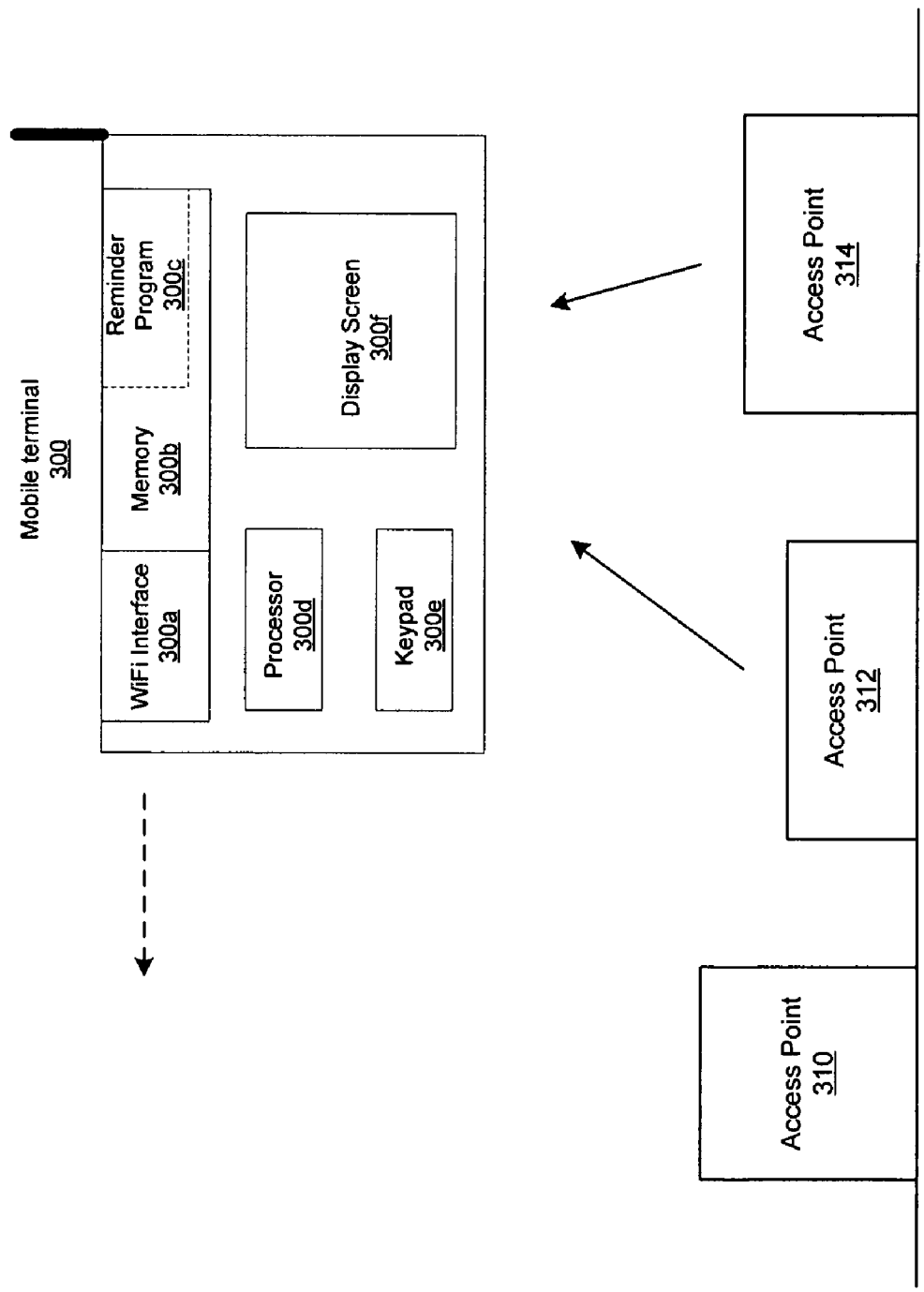
FIG. 3 is a block diagram illustrating exemplary mobile terminal that is enabled for detection of ESSIDs associated with WiFi LANs, in accordance with an embodiment of the invention.

FIG. 3 is a block diagram illustrating exemplary mobile terminal that is enabled for detection of ESSIDs associated with WiFi LANs, in accordance with an embodiment of the invention. Referring to FIG. 3, there is shown a mobile terminal 300, and a plurality of WiFi access points 310, 312, and 314, where each WiFi access point may be associated with, for example, a store. Accordingly, each WiFi access point 310, 312, and 314 may broadcast its ESSID. The mobile terminal 300 may comprise a WiFi interface 300a and a memory 300b. The WiFi interface 300a may comprise suitable logic, circuitry, and/or code that may enable communication with WiFi devices such as, for example, the WiFi access points 310, 312, and 314. The memory 300b may store, for example, a reminder program 300c that, when executed by, for example, a processor 300d, may enable reminding a user when a reminder keyword matches a portion of an ESSID. The mobile terminal 300 may also comprise a keypad 300e and a display screen 300f. The mobile terminal 300, which may be, for example, a WiFi enabled cellular phone, or a WiFi enabled PDA such as a Smartphone, or a WiFi enabled laptop, may receive the ESSIDs from the LAN access points that may be in range.

The mobile terminal 300 may receive the ESSIDs that may be associated with various access points installed by stores. The ESSIDs may have, for example, the corresponding store name and/or location information as part of the ESSID. In order to reduce power consumption, the WiFi interface 300a on the mobile terminal 300 may periodically wake up from a power saving mode in order to detect beacon signals and the ESSIDs of nearby WiFi access points.

In an exemplary embodiment of the invention, the user may have entered a reminder into the mobile terminal 300 to make a purchase at the store associated with the WiFi access point 310. A keyword entered for the reminder memo may be, for example, the store name associated with the WiFi access point 310. The keyword may be entered via, for example, the keypad 300e. The reminder memo may be, for example, text, audio, and/or video that may remind the user of a task to be completed, for example, at the store. Video may comprise any optical display such as graphics, digital photographs, and/or multiple frame video files. A default mode may be to display the reminder keyword if there is no reminder memo. The reminder memo may be displayed, for example, via the display screen 300f.

Another embodiment of the invention may also enable a user to save a message, for example, a text message, audio message, and/or a video message, sent by a caller as a reminder. For example, the mobile terminal 300 may receive a text message from, for example, a spouse of the user. The mobile terminal 300 user may save the text message as the reminder memo, and may enter a keyword for the reminder memo.

Other embodiments of the invention may allow the user to enable specific callers to directly leave reminders with associated keywords on the user's mobile terminal without any further intervention by the user. For example, the mobile terminal 300 may be enabled to allow another party, for example, the user's spouse, to directly leave a reminder on the mobile terminal 300. Accordingly, the mobile terminal 300 may receive a text message from a spouse and save that as a reminder memo. The spouse may also send a second text message that may be the keyword for the reminder memo just sent. Another embodiment of the invention may accept one message with both the memo and keyword. For example, the keyword may be the first word or words that ends in a special character, such as, for example, a period.

There may also be a notifying sound and/or vibration of the mobile terminal 300 that may notify the user to display the reminder memo, or to listen to the reminder memo. Other forms of notification may also be used, such as, for example, displaying video and/or flashing of lights on the mobile terminal 300. The mobile terminal 300 may also have an option to notify periodically if the user has not displayed or played the reminder memo. This may allow the user to pay full attention to the task at hand, for example, driving a car, until it is safe to retrieve the reminder memo. After the user has read or listened to the reminder memo, the reminder memo may be deleted, deferred, or otherwise modified.

If deferred, the reminder keyword associated with that reminder memo may be, for example, compared after leaving and re-entering the broadcast range of the WiFi access point associated with the store of interest. This may prevent repetitive reminders as the reminder keyword is matched with the ESSID associated with the WiFi LAN for the store where the user may be. Alternatively, deferring may allow notification to occur again after a period of time that may be a default time or chosen by the user. The specific notification details may be design and/or implementation dependent.

If not deferred, an embodiment of the invention may also notify the user for a period of time and then go dormant for a period of time. After a dormancy period, the notification may re-occur if the ESSID that matches the reminder keyword can still be received. The period of time for notification, and what the dormancy period may be, if any, may be default values and/or may be adjustable by the user.

Prior to notifying the user, the mobile terminal 300 may attempt to authenticate the matching information in the ESSID. However, a store may deploy a WiFi access point that just broadcasts the ESSID as location/identity indicators. Accordingly, a mobile terminal user may not be able to access a network associated with the store for authentication. However, a WiFi access point may broadcast an ESSID starting with "eap://" if the store allows third-parties to access its network to authenticate its ESSID via the IEEE 802.1x extensible authentication protocol (EAP).

Alternatively, a WiFi access point may broadcast an ESSID starting with, for example, "https://" in order to indicate that the store allows third-parties to access its network to authenticate its ESSID using the web server's security certificate. For example, a store may deploy a Web server, a DHCP server, a DNS server, and a firewall behind a WiFi access point. The mobile terminal 300 may try to set up a secure sockets layer (SSL) connection to the Web server. If the SSL connection can be successfully established and if the identity certified by the security certificate matches the location/identity in the uniform resource locator (URL), the location/identity information may be deemed trustworthy. Accordingly, upon successful authentication by either of the two methods discussed, or by other methods that may be designed and/or implemented, the mobile terminal 300 may notify the user. However, if the authentication fails, the ESSID may be stored, for example, in a do-not-trust list. The do-not-trust list may be, for example, part of the memory 300b.

Accordingly, the mobile terminal 300 equipped with the WiFi interface 300a may execute the reminder program 300c, which may be stored in, for example, memory 300b. When the reminder program 300c is executing, the user may browse, look-up, create, remove, or modify reminder records and/or WiFi configuration records. Whenever the user has a location-related action item, the user may enter a reminder record into the mobile terminal 300. The reminder record may comprise, for example, a reminder keyword and a reminder memo. There may be an option to specify that the detected ESSID be authenticated. Authentication may be described in more detail with respect to FIGS. 5, 6, and 7.

A user may also save some WiFi configuration records to help detect whether the user is in some particular places such as home or office with WiFi LANs. For example, a WiFi configuration record may include a location keyword such as "office" and the WiFi networking configuration for that place. The mobile terminal 300 may attempt to access those LANs using the stored configurations. If successful, the mobile terminal 300 may, for example, synchronize and transfer data with a computer.

In an exemplary scenario, the mobile terminal 300 may have a reminder for the store associated with the access point 310. As the mobile terminal moves, it may receive the ESSIDs that may be associated with the access point 312 and the access point 314. With each new ESSID that the mobile terminal 300 receives, the mobile terminal 300 may check to see if any of the reminder keywords for the stored reminder records may match any part of the ESSID. In this case, the reminder keyword may not match any part of the ESSIDs for the access points 312 and 314. As the user carrying the mobile terminal 300 moves, for example, to the left, the mobile terminal 300 may be within the range of the access point 310, 312, and 314, and hence be able to receive the ESSIDs associated with those access points. Accordingly, the mobile terminal 300 may be enabled to determine whether the reminder keyword may match any part of the ESSID associated with the access point 310. If the keyword may matches any part of the ESSID, the mobile terminal 300 may display and/or play the reminder for the user. The user may read, view, and/or listen to the reminder message. The user may then delete the message and carry out the tasks needed.

While FIG. 3 may describe an embodiment of the invention using the IEEE 802.1x (WiFi) compatible mobile terminal for simplicity of description, the invention need not be so limited. Various embodiments of the invention may be used with other wireless standards, such as, for example, Bluetooth, HomeRF, HiperLAN, and OpenAir.

Figure 4:
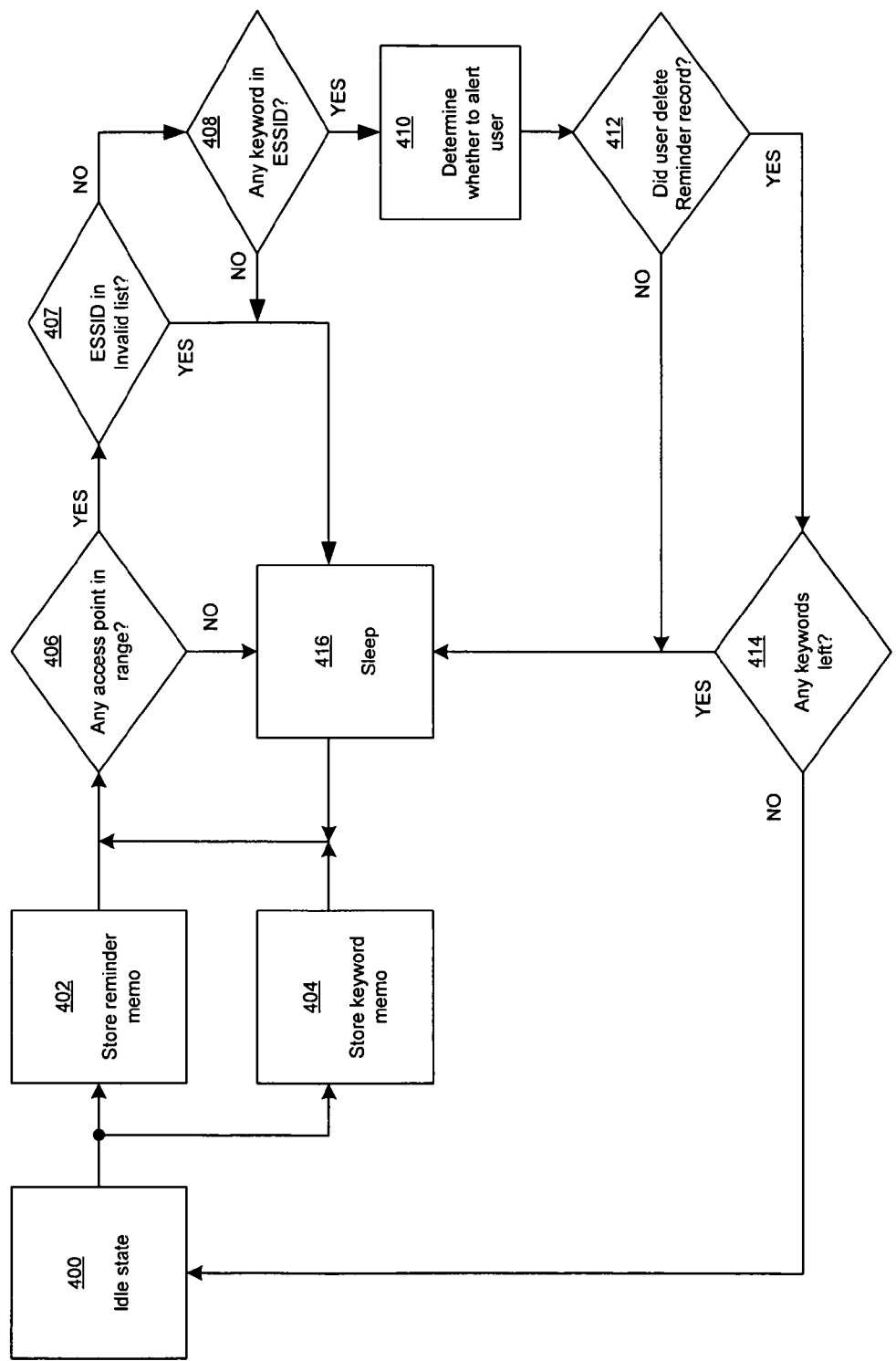
FIG. 4 is a flow chart illustrating exemplary steps for using a mobile terminal as a location-based reminder, in accordance with an embodiment of the invention.

FIG. 4 is a flow chart illustrating exemplary steps for using a mobile terminal as a location-based reminder, in accordance with an embodiment of the invention. Referring to FIG. 4, there is shown steps step 400 to 416. Step 400 may be an idle state. For example, if there are no reminder records or configuration records, the reminder program 300c may be in an idle state. In the idle state, power may be, for example, reduced or shut off for the WiFi interface 300a. In step 402, when the user enters data for a reminder record, a reminder memo may be stored in, for example, the memory 300b. The next step may be step 406. In step 404, a reminder keyword may be stored in, for example, the memory 300b. In step 406, the WiFi interface 300a may be powered up to an active state. The reminder program 300c may be executed to determine, via the WiFi interface 300a, if any access point may be transmitting an ESSID. If an ESSID is not detected, the next step may be step 416. Otherwise, the next step may be step 407. In step 407, the reminder program may determine whether the ESSID may be in an invalid list or a do-not-trust list. The invalid list may be, for example, stored in the memory 300b, and may comprise ESSIDs that have failed to authenticate. If the ESSID is in the invalid list, the next step may be step 416. Otherwise, the next step may be step 408.

In step 408, the reminder program 300c may execute steps to determine if any of the reminder keywords is found in the detected ESSID. If so, the next step may be step 410. Otherwise, the next step may be step 416. In step 410, the reminder program 300c may determine whether to notify the mobile terminal user. For example, if a reminder keyword is found in an ESSID, the user may be notified. Alternatively, even if the reminder keyword is found in an ESSID, if the reminder keyword cannot be authenticated, the user may not be notified. Authentication may be described in more detail with respect to FIGS. 5, 6, and 7.

In step 412, if the user was notified, the reminder record associated with the notification may be deleted by the user. If the user deleted a reminder record, the next step may be step 414. Otherwise, if the user was not notified or if the user deferred the notification, the next step may be step 416. In step 414, the reminder program 300c may execute steps to determine if there are any keywords remaining. If so, the next step may be step 416. Otherwise, the next step may be step 400, the idle state. In step 416, the reminder program 300c may execute steps to put the WiFi interface 300a into a sleep mode. This may reduce power consumption in the mobile terminal 300. After a period of time, which may be a default period, or a period selected by the user, the reminder program 300c may execute steps to go to the step 406. For example, during the sleep period of 416, the reminder program 300c may be put in a background mode, or context switch to another application program. After the sleep period, a hardware interrupt, for example, may result in the reminder program 300c being placed into a foreground mode, or context switch to the reminder program 300c.

The steps described in the FIG. 4 may be exemplary steps for an embodiment of the invention. Other embodiments of the invention may use different steps.

Figure 5:
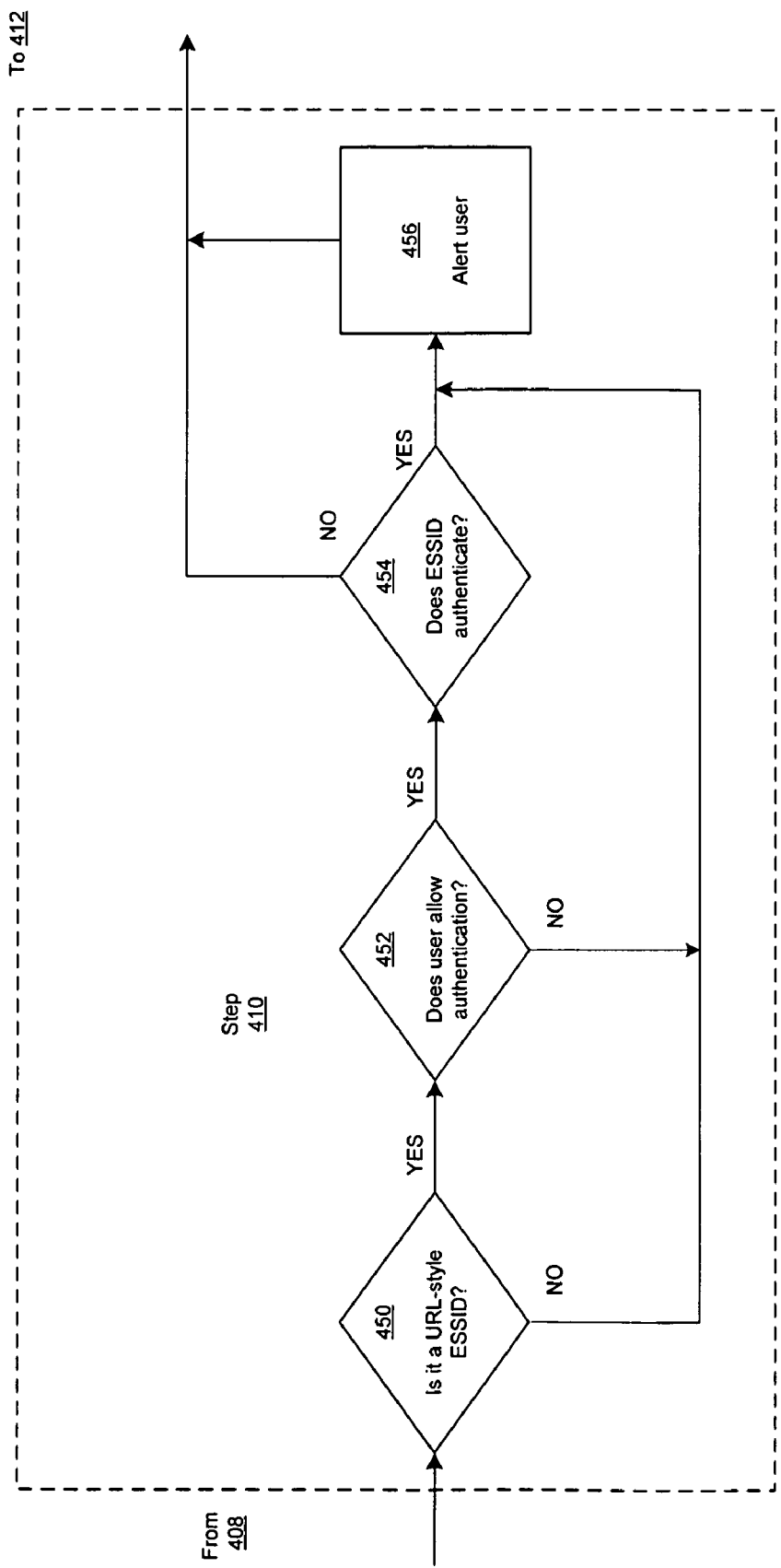
FIG. 5 is a flow chart illustrating exemplary steps for determining whether to notify a user of a location-based reminder, in accordance with an embodiment of the invention.

FIG. 5 is a flow chart illustrating exemplary steps for determining whether to notify a user of a location-based reminder, in accordance with an embodiment of the invention. Referring to FIG. 5, there is shown the step 410, which may further comprise steps 450 to 456. In step 450, where a previous step may have been step 408, the reminder program 300c may determine whether a ESSID may be a URL-style ESSID. For example, the URL-style ESSID may comprise the character string "http://," "https://," or "eap://" as part of its ESSID. If so, the next step may be step 452. Otherwise, the next step may be step 456. In step 452, the reminder program 300c may determine whether to authenticate URL-style ESSIDs. If so, the next step may be step 454. Otherwise, the next step may be step 456.

In step 454, the reminder program 300c may, via the WiFi interface 300a, connect to a server associated with the ESSID. The reminder program 300c may attempt to authenticate the ESSID. IF the ESSID is authenticated, the next step may be step 456. Otherwise the next step may be step 412 in FIG. 4. In step 456, the reminder program 300c may cause the mobile terminal 300 to generate a notification, or an alert. For example, the mobile terminal may generate a notification or an alert by playing a sound on the mobile terminal, flashing a light and/or an LED, and/or vibrating the mobile terminal. The next step may be step 412 in FIG. 4.

Figure 6:
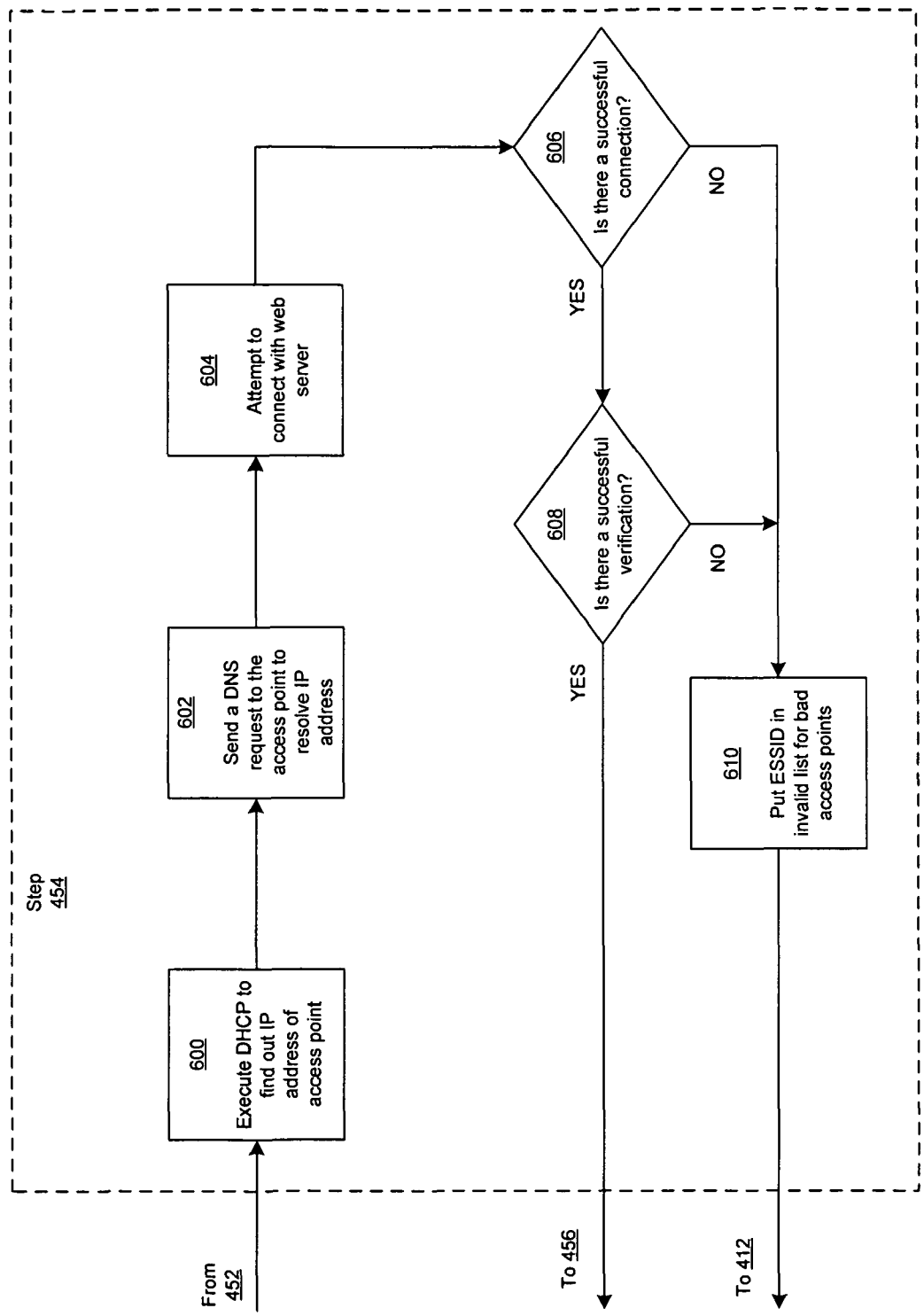
FIG. 6 is a flow chart illustrating exemplary steps for authentication using a SSL, in accordance with an embodiment of the invention.

FIG. 6 is a flow chart illustrating exemplary steps for authentication using a SSL, in accordance with an embodiment of the invention. Referring to FIG. 6, there is shown steps 600 to 610 that may be used for authentication of an ESSID using a SSL. In step 600, the WiFi interface 300a in the mobile terminal 300 may use DHCP to receive an IP address from the access point. A link-layer authentication/encryption may be turned off when using the SSL protocol. In step 602, the mobile terminal 300 may send a DNS request to the access point associated with the ESSID to resolve the IP address of the Web server named in the URL. In step 604, the mobile terminal 300 may try to set up a SSL connection with the Web server using the IP address from step 602. In step 606, if the SSL connection to the web server was set up successfully, the next step may be step 608. Otherwise, the next step may be step 610.

In step 608, the mobile terminal 300 may try to verify whether the identity in the ESSID is the same as the certified identity in the security certificate. If so, the authentication process may have been successful, and the next step may be step 456 in FIG. 5. Otherwise, the next step may be step 610. In step 610, the authentication may have failed because of inability to connect to the web server, or a connection was made to the web server but authentication of the ESSID failed. Accordingly, the mobile terminal 300 may ignore this ESSID and may put the ESSID for the access point on, for example, an invalid list or a do-not-trust list. The invalid list may be a list of ESSIDs for invalid access points. Access points may be invalid, for example, when a connection cannot be made to it, or if a connection can be made but the ESSID cannot be authenticated. Any entry in to the invalid list may be removed from the list by the user or after a certain amount of time in the invalid list. The length of time an ESSID may remain in the invalid list may be a default time or a time set by the user. The next step may be step 412 in FIG. 4.

Figure 7:
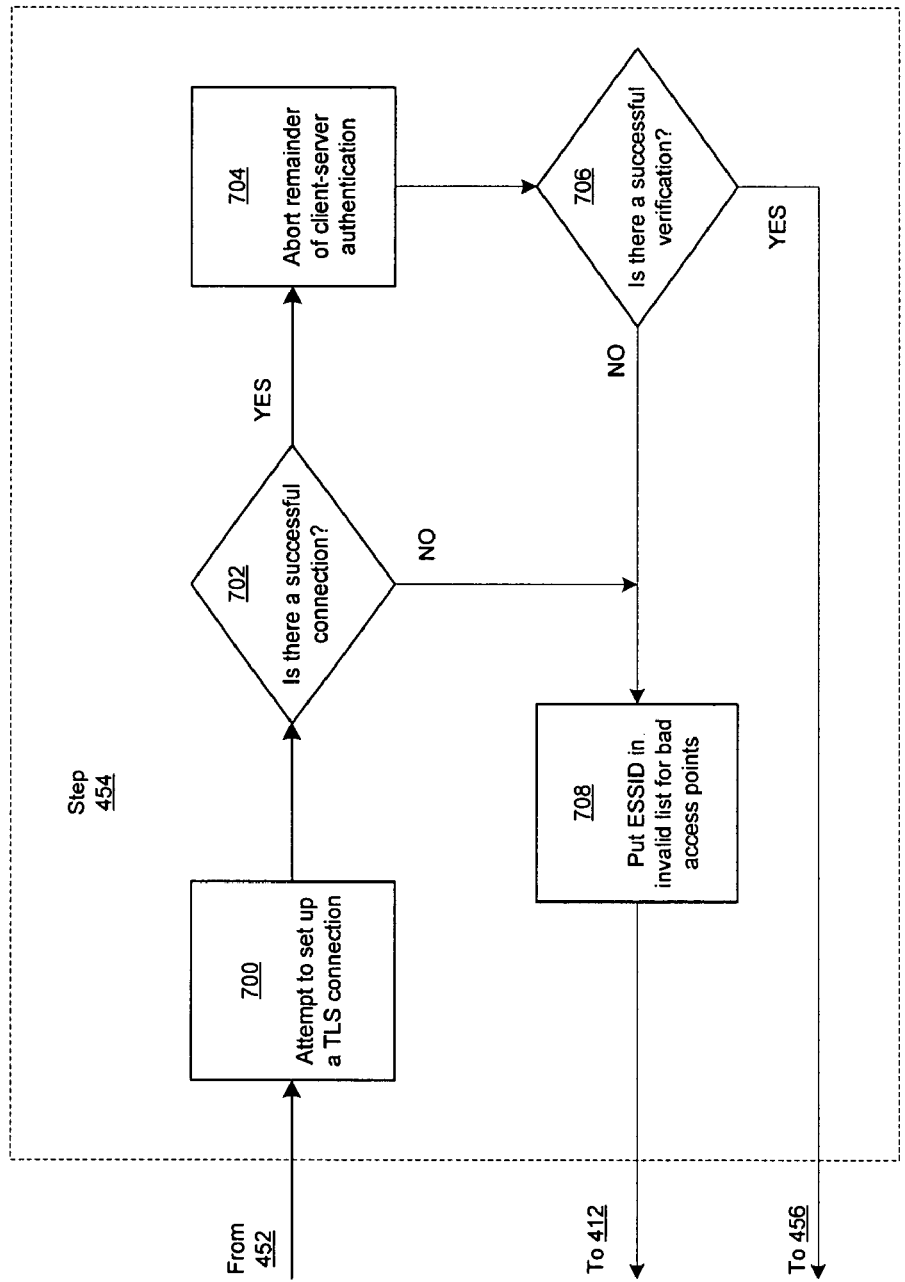
FIG. 7 is a flow chart illustrating exemplary steps for authentication using 802.1x/EAP-TTLS protocol, in accordance with an embodiment of the invention.

FIG. 7 is a flow chart illustrating exemplary steps for authentication using 802.1x/EAP-TTLS protocol, in accordance with an embodiment of the invention. Referring to FIG. 7, there is shown steps 700 to 708 that may be used for authentication of an ESSID using 802.1x/EAP-TTLS protocol. In step 700, where the previous step may have been step 450, the WiFi interface 300a in the mobile terminal 300 may initiate link-layer authentication process by trying to set up a TLS connection to the authentication server via the access point using 802.1x/EAP-TTLS protocol. In step 702, if the TLS connection can be set up, the next step may be step 704. Otherwise, the next step may be step 708.

In step 704, the mobile terminal 300 may abort the remainder of client-to-server authentication. In step 706, the mobile terminal 300 may verify whether the ESSID contains an identity that is the certified identity in the security certificate. If the authentication is successful, the next step may be step 456 in FIG. 5. If the TLS connection cannot be set up or if the ESSID does not contain the certified identity, the authentication may have failed, and the next step may be step 708.

In step 708 the authentication may have failed because of inability to establish a connection to the web server, or a connection was made to the web server but authentication of the ESSID failed. Accordingly, the mobile terminal 300 may ignore this ESSID and may put the ESSID for the access point in, for example, an invalid list or a do-not-trust list. The invalid list may be a list of ESSIDs for invalid access points. Access points may be invalid, for example, when a connection cannot be made to it, or if a connection can be made but the ESSID cannot be authenticated. Any entry in to the invalid list may be removed from the list by the user or after a certain amount of time in the invalid list. The length of time an ESSID may remain in the invalid list may be a default time or a time that may be configured by the user. The next step may be step 412 in FIG. 4.

Figure 8:
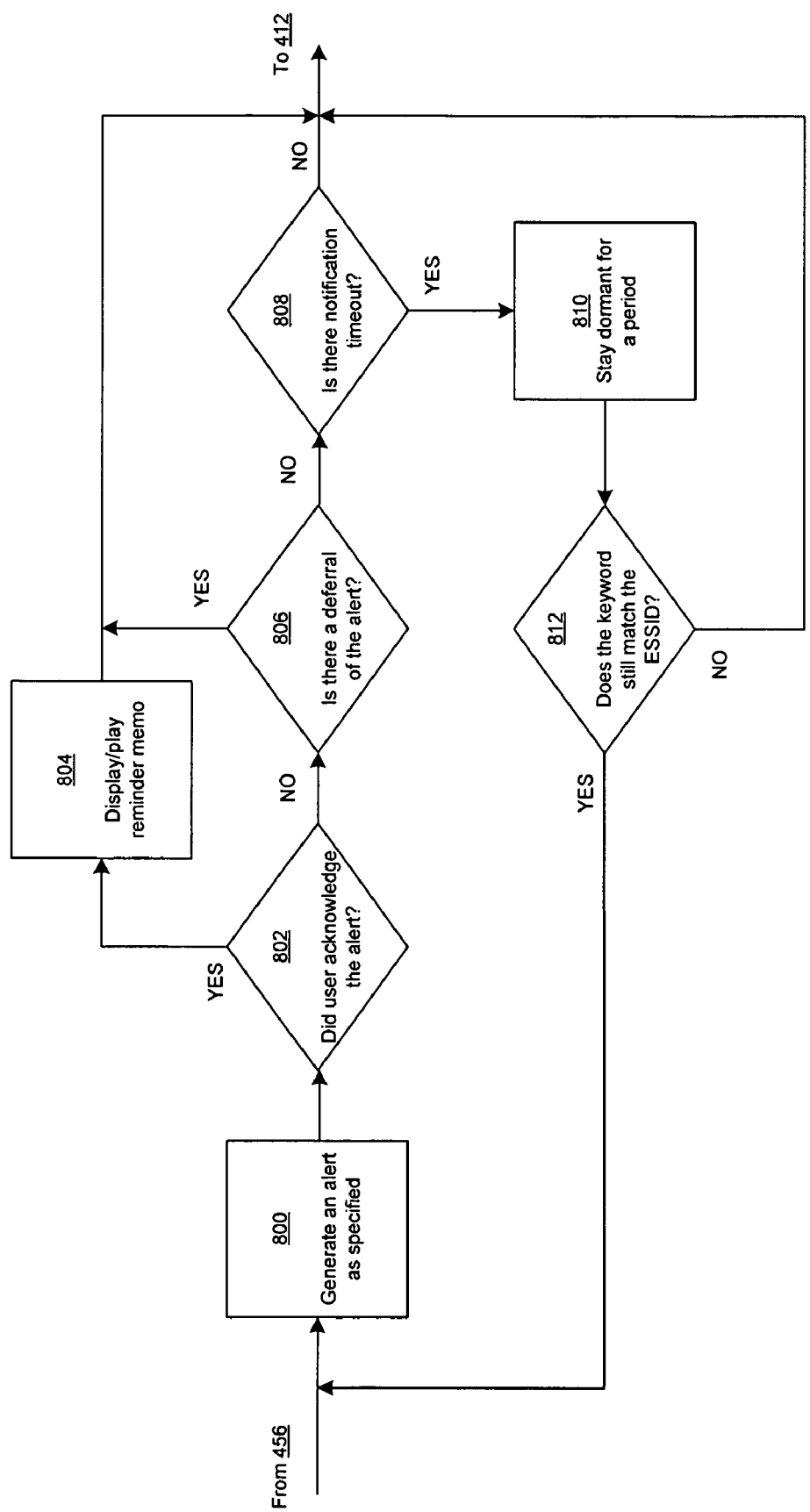
FIG. 8 is a flow chart illustrating exemplary steps for a portion of a user interface, in accordance with an embodiment of the invention.

FIG. 8 is a flow chart illustrating exemplary steps for a portion of a user interface, in accordance with an embodiment of the invention. Referring to FIG. 8, there is shown exemplary steps 800 to 810, which may be during a notification or alert. In step 800, a notification or alert may be generated. For example, a sound may be played by the mobile terminal 300, a video or text may be displayed by the mobile terminal 300, the mobile terminal 300 may vibrate, and/or lights and/or LEDs on the mobile terminal 300 may be turned on or flashed.

In step 802, if the user acknowledges the notification or alert, for example, by activating a key on the keypad 300e or a softkey that may be displayed on the display screen 300f of the mobile terminal 300, the next step may be step 804. Alternatively, the user may defer the notification till a later time. In that case, the next step may be step 806.

In step 804, if the reminder memo comprises an audio portion, the mobile terminal 300 may play the audio portion. If the reminder memo comprises a video portion, the mobile terminal 300 may display the video portion. The next step may be step 412.

In step 806, if there is a deferral of the alert by, for example, the user of the mobile terminal 300, the next step may be step 412. Otherwise, the next step may be step 808. In step 808, if there is a notification timeout, for example, if the notification has been occurring for a pre-determined period of time without an acknowledgment or deferral, the next step may be step 810. Otherwise, the next step may be step 412.

In step 810, the notification may not occur for a pre-determined period of time. Accordingly, there may not be any notification during this period. After the pre-determined period elapses, the next step may be step 810. In step 810, if the ESSID that matched the keyword is still being received by the mobile terminal 300, the next step may be step 800 where notification may occur. Otherwise, if no ESSID matches the keyword, the next step may be step 412.

Although specific algorithms may have been described with respect to some embodiments of the invention, the invention need not be so limited. Other embodiments of the invention may use other algorithms for location based reminders and user interface. The algorithms used may be design and/or implementation dependent.

Although the functionality for various embodiments and/or aspects of the invention may have been described with respect to a reminder program 300c, the invention need not be so limited. For example, the functions of this invention may be implemented in hardware, software, or a combination of both hardware and software.

In accordance with an embodiment of the invention, aspects of an exemplary system may comprise wireless interface, for example, the WiFi interface 300a, in a mobile terminal that enables reception of wireless signal comprising network identifying information, which may be, for example, a wireless network identification string. The wireless network identifier string may be, for example, the ESSID of a WiFi access point in accordance with IEEE 802.1x. The received ESSID may be authenticated if the ESSID comprises a URL. Authentication may comprise using a SSL connection to access the wireless network, or using an 802.1x/EAP-TTLS protocol. An ESSID that fails authentication may be put, for example, in an invalid list.

A matching circuitry, which may be, for example, the processor 300d, and/or code may enable matching of keywords stored within the mobile terminal with the received wireless network identifier string. Notification circuitry, which may also be the processor 300d, and/or code may enable generation of notification at the mobile terminal if a keyword is found in the wireless network identifier string. After notification, if the user chooses to play and/or view the reminder, the mobile terminal may display the video or text reminder field, and/or play the audio reminder. The notification may be generated again at a later time if, for example, the user defers listening to and/or viewing the reminder message because the user may be driving a car.

A mobile terminal user may enter all of a record, or a portion of the record, where the record may comprise, for example, a keyword field and a reminder field. The keyword field may comprise at least one keyword that may be entered by the user. The reminder field may comprise a video, audio, and/or text reminder that may be entered by the user. Alternatively, contents of the keyword field and/or the reminder field may be generated from an incoming message.

Another embodiment of the invention may provide a machine-readable storage, having stored thereon, a computer program having at least one code section executable by a machine, thereby causing the machine to perform the steps as described above for using a mobile terminal to provide location-based reminder.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will comprise all embodiments falling within the scope of the appended claims.

What is claimed is:

1. A method for providing location based services in a mobile device, the method comprising:
   receiving at a mobile terminal a wireless signal comprising network identifying information;
   generating and storing within said mobile terminal, at least one record based on an incoming message received from one of a plurality of senders specified within said mobile terminal, wherein a keyword corresponding to said generated at least one record stored within said mobile terminal is received from said one sender separately from said incoming message;
   comparing said keyword corresponding to said generated at least one record stored within said mobile terminal with at least a portion of said network identifying information;
   if said keyword matches at least a portion of said network identifying information, generating a notification at said mobile terminal, said generated notification being repeatedly communicated by said mobile terminal until a message associated with said notification is output by said mobile terminal;

determining by said mobile terminal, a status of said generated notification; and controlling operation of said mobile terminal based on said determined status.

2. The method according to claim 1, wherein at least a portion of said at least one record is entered into said mobile terminal by a user.

3. The method according to claim 1, wherein said at least one record comprises a reminder field and a keyword field, wherein said keyword field comprises at least one said keyword.

4. The method according to claim 3, wherein said reminder field comprises at least one of the following: an audio message, a video message, and a text message.

5. The method according to claim 4, if said reminder field comprises at least one of: said video message and said text message, further comprising displaying contents of said reminder field.

6. The method according to claim 4, if said reminder field comprises said audio message, further comprising playing contents of said reminder field.

7. The method according to claim 1, comprising repeating said generation of said notification after a specified period of time has elapsed.

8. The method according to claim 1, wherein the identifying information comprises a wireless network identification string.

9. The method according to claim 8, wherein said wireless network identification string comprises an ESSID in accordance with IEEE 802.1x.

10. The method according to claim 9, comprising authenticating said ESSID using one of: SSL protocol and 802.1x/EAP-TTLS protocol.

11. The method according to claim 10, wherein said ESSID that fails said authenticating is put in a do-not-trust list on said mobile terminal.

12. The method according to claim 1, wherein said status comprises one or more of acknowledged, not yet acknowledged, deleted, deferred, modified, dormant and/or repeating.

13. The method according to claim 12, comprising determining said status of said notification in said mobile terminal based on input from a user of said mobile terminal.

14. The method according to claim 12, comprising controlling repetition of said notification in instances when said mobile terminal exits and re-enters broadcast range of said wireless signal comprising said network identifying information.

15. The method according to claim 12, comprising repeating said notification after a specified and/or a default duration of time in instances when said status comprises deferred.

16. The method according to claim 12, comprising controlling a period of time for sending said notification and/or a period of time of dormancy wherein said notification may be repeated after said duration of time of dormancy.

17. The method according to claim 16, wherein said duration of time for sending said notification and/or said duration of time of dormancy is adjustable.

18. The method according to claim 1, wherein said generated notification is periodically repeatedly communicated by said mobile terminal.

19. A system for providing location based services in a mobile device, the system comprising:

one or more circuits for use in a mobile terminal, said one or more circuits comprise a wireless interface, wherein said wireless interface enables reception of a wireless signal comprising network identifying information;

said one or more circuits are operable to generate and store within said mobile terminal, at least one record based on an incoming message received from one of a plurality of senders specified within said mobile terminal, wherein a keyword corresponding to said generated at least one record stored within said mobile terminal is received from said one sender separately from said incoming message;

said one or more circuits are operable to compare said keyword corresponding to said generated at least one record stored within said mobile terminal with at least a portion of said network identifying information;

said one or more circuits are operable to generate notification at said mobile terminal, if said keyword matches at least a portion of said network identifying information, said generated notification being repeatedly communicated by said mobile terminal until a message associated with said notification is output by said mobile terminal;

said one or more circuits are operable to determine a status of said generated notification; and said one or more circuits are operable to control operation of said mobile terminal based on said determined status.

20. The system according to claim 19, wherein at least a portion of said at least one record is entered into said mobile terminal by a user.

21. The system according to claim 19, wherein said at least one record comprises a reminder field and a keyword field, wherein said keyword field comprises at least one said keyword.

22. The system according to claim 21, wherein said reminder field comprises at least one of the following: an audio message, a video message, and a text message.

23. The system according to claim 22, comprising said mobile terminal displaying contents of said reminder field if said reminder field comprises at least one of: said video message and said text message.

24. The system according to claim 22, wherein said mobile terminal plays contents of said reminder field if said reminder field comprises said audio message.

25. The system according to claim 19, wherein said notification circuitry repeats generating said notification after a specified time has elapsed.

26. The system according to claim 19, wherein said network identifying information comprises a wireless network identification string.

27. The system according to claim 26, wherein said wireless network identification string comprises an ESSID in accordance with IEEE 802.1x.

28. The system according to claim 27, wherein said mobile terminal enables authentication of said ESSID using one of: SSL protocol and 802.1x/EAP-TTLS protocol.

29. The system according to claim 28, wherein said ESSID that fails said authentication is put in a do-not-trust list on said mobile terminal.

30. The system according to claim 19, wherein said status comprises one or more of acknowledged, not yet acknowledged, deleted, deferred, modified, dormant and/or repeating.

31. The system according to claim 30, wherein said one or more circuits are operable to determine said status of said notification in said mobile terminal based on input from a user of said mobile terminal.

32. The system according to claim 30, wherein said one or more circuits are operable to control repetition of said notification in instances when said mobile terminal exits and re-enters broadcast range of said wireless signal comprising said network identifying information.

33. The system according to claim 30, wherein said one or more circuits are operable to repeat said notification after a specified and/or a default duration of time in instances when said status comprises deferred.

34. The system according to claim 30, wherein said one or more circuits are operable to control a period of time for sending said notification and/or a period of time of dormancy wherein said notification may be repeated after said duration of time of dormancy.

35. The system according to claim 34, wherein said duration of time for generating and/or repeating of said notification and/or said duration of time of dormancy is adjustable.

36. The system according to claim 19, wherein said generated notification is periodically repeatedly communicated by said mobile terminal.

* * * * *